UNITED STATES PATENT OFFICE.

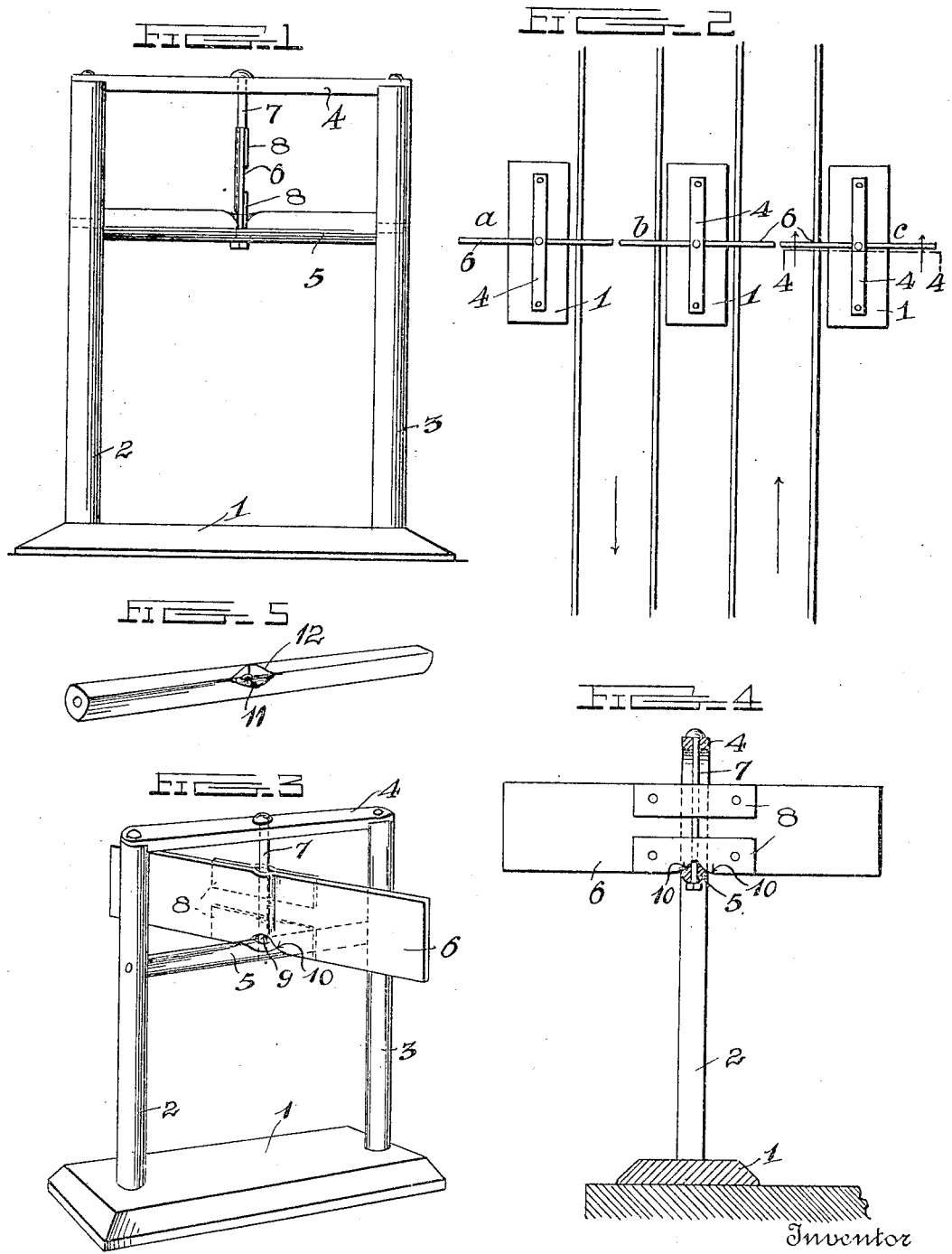

JEFFERSON B. BULLOCK, OF RED LEVEL, ALABAMA.

GATE.

No. 927,633.           Specification of Letters Patent.          Patented July 13, 1909.

Application filed March 11, 1909. Serial No. 482,744.

*To all whom it may concern:*

Be it known that I, JEFFERSON B. BULLOCK, a citizen of the United States, residing at Red Level, in the county of Covington and State of Alabama, have invented certain new and useful Improvements in Gates; and I do declare the following to be a full, clear, and exact description of the invention, such as will enable others skilled in the art to which it appertains to make and use the same.

My invention relates to gates and more particularly to gates to be utilized as cattle guards.

The object of the invention is to provide a simple, cheap and efficient structure which may be operated by the train and automatically return to normal position without the aid of any mechanism whatsoever.

With this and other objects in view, the invention consists of certain novel features of construction, combination and arrangement of parts, as will be more fully described and particularly pointed out in the appended claim.

In the drawing, Figure 1 is a side elevation of the device; Fig. 2 is a top plan view; Fig. 3 is a perspective view of one of the gates; Fig. 4 is a vertical section on the line 4—4 of Fig. 2, and Fig. 5 is a perspective detail of the supporting brace.

In the special embodiment of my invention I preferably mount three separate gates, as shown in Fig. 2, across the two tracks, the intermediate gate acting as a part for both tracks. As all of these gates are alike and their mountings similar, I shall describe only one of them in detail.

The base 1 may be made of any suitable material and has extending upwardly therefrom the uprights 2 and 3 which are connected at their upper ends by a top brace 4. Intermediate their length and preferably closer to the top brace than to the base is a supporting brace or bar 5 which is adapted to receive the weight of and support the gate 6, which is pivotally mounted upon the central pivoting bolt or rod 7. This rod is passed through an aperture formed in the center of the supporting brace 5. Suitable bearing bands 8 are secured to the gate so as to receive the pivoting rod 7.

The lower side of the gate at the point where the pivoting rod passes through is notched, as shown at 9 in Fig. 4 to form two inclined sides 10 which are adapted to engage the inclined walls 11 of the notch 12 which is formed on either side of the aperture in the bar through which the pivot rod passes. When the gate at either end is struck by a train the inclined edges 10 ride up upon the inclined walls of the notch 12 until the sides of the gate engage the uprights 2 and 3. During this movement the gate rises upon the pivot rod a slight distance so that when the gate is released by the train its weight will cause it to gravitate over the inclined walls and thus slide back to normal position transverse to the base.

It will be noticed that while I have shown three gates, *a*, *b* and *c* arranged to be operated by the trains and that any one of the gates may be operated in either direction, the middle gate *b* will only be operated in one direction by trains passing on either track. This is true of the gates *a* and *c* also. These gates are so nicely balanced that the wind of the passing train will hold them in operative position after they have once been thrown by the engine, and therefore each car in the train will not be engaged by the gate and possibly scarred by contact therewith. After the train has passed, the gates will hold open for a short period owing to the suction of air caused thereby and eventually swing to with an easy oscillating motion.

It will be noticed that by removing the pivotal rod that the gates may be reversed when either side becomes worn.

While I have shown the preferred form of gate as applied to guard a railway track, it will be clearly understood that I might use the device in any place where such a gate would prove efficient.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent, is:—

In a device of the class described, the combination with a base, of a pair of uprights at the ends thereof, of a supporting brace bridge therebetween and extending longitudinally of the base, a top brace, a pivoting member extending between the top brace and the supporting member, a gate revolubly mounted upon the pivoting member, said gate also having free vertical movement thereon, a notch formed in the supporting brace, a notch formed in the gate, each of said notches having inclined walls adapted to co-act with each other to maintain the gate normally transverse to the supporting brace and base, said walls adapted to return the gate to normal after being operated and said uprights adapted to prevent rotation of said gate.

In testimony whereof I have hereunto set my hand in presence of two subscribing witnesses.

JEFFERSON B. BULLOCK.

Witnesses:
R. H. JONES,
A. R. ROWELL.